US012715215B2

(12) United States Patent
Morikawa

(10) Patent No.: US 12,715,215 B2
(45) Date of Patent: Aug. 25, 2026

(54) MANUFACTURING METHOD OF LIQUID EJECTION HEAD AND LIQUID EJECTION HEAD

(71) Applicant: CANON KABUSHIKI KAISHA, Tokyo (JP)

(72) Inventor: Tomoki Morikawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 191 days.

(21) Appl. No.: 18/442,657

(22) Filed: Feb. 15, 2024

(65) Prior Publication Data

US 2024/0300243 A1 Sep. 12, 2024

(30) Foreign Application Priority Data

Mar. 10, 2023 (JP) ................................ 2023-037171

(51) Int. Cl.
*B41J 2/16* (2006.01)
*B41J 2/14* (2006.01)

(52) U.S. Cl.
CPC ............... *B41J 2/1623* (2013.01); *B41J 2/14* (2013.01); *B41J 2002/14491* (2013.01)

(58) Field of Classification Search
CPC .. B41J 2/1623; B41J 2/14; B41J 2002/14491; B41J 2/14024
See application file for complete search history.

(56) References Cited

U.S. PATENT DOCUMENTS

| | | | | |
|---|---|---|---|---|
| 6,119,334 | A * | 9/2000 | Watanabe | B41J 2/1623 29/829 |
| 2020/0331261 | A1* | 10/2020 | Kudo | B41J 2/1607 |
| 2020/0384765 | A1* | 12/2020 | Mizuno | B41J 2/14233 |

FOREIGN PATENT DOCUMENTS

| | | | |
|---|---|---|---|
| JP | 2021187010 | A | 12/2021 |

* cited by examiner

*Primary Examiner* — Jason S Uhlenhake
(74) *Attorney, Agent, or Firm* — Canon U.S.A., Inc. IP Division

(57) ABSTRACT

In a method for manufacturing a liquid ejection head having an ejection unit including an element substrate provided with ejection ports to eject liquid, and a support member to support the ejection unit with a support surface and provided with a liquid supply path, the method includes arranging and curing. A first adhesive is arranged to surround the supply path and a second adhesive is arranged in each of at least three of four areas obtained by dividing an area where the ejection unit contacts the support surface by a first straight line connecting centers of two sides and a second straight line connecting centers of two sides at a position overlapping an outer periphery of the area where the ejection unit contacts the support surface. The ejection unit is arranged on the support surface, the second adhesive is cured, and the first adhesive is cured in this order.

16 Claims, 14 Drawing Sheets

MANUFACTURING METHOD OF LIQUID EJECTION HEAD AND LIQUID EJECTION HEAD

BACKGROUND

Field

The present disclosure relates to a method for manufacturing a liquid ejection head and the liquid ejection head.

Description of the Related Art

In a liquid ejection apparatus such as an ink jet recording apparatus, a liquid ejection head may be used in which an element substrate provided with an ejection port for ejecting liquid such as ink is arranged on a support member. For example, Japanese Patent Application Laid-Open No. 2021-187010 discloses a method for manufacturing a liquid discharge head in which first and second element substrates are mounted on a mounting surface of a support member, and the mounting position of and a discharge port formation surface of the second element substrate are separated from each other.

There are liquid ejection heads in which a conventional element substrate provided with an ejection port is arranged on a support member where there could be a height deviation or a positional deviation in arrangement of the conventional element substrate. In such a case, an ejected droplet may hit a different position on a recording medium and cause a printing defect such as color unevenness or a streak. Thus, when the conventional element substrate is bonded to a support member, it is desirable to suppress a height deviation or a positional deviation of an ejection port formation surface to increase arrangement accuracy. In arrangement of the conventional element substrate on the support member, a configuration in which the conventional element substrate is fixed via an adhesive is generally used, and particularly, a thermosetting-type adhesive with high ink resistance is often used. Thus, the support member may be significantly deformed due to thermal deformation at the time of curing the adhesive by heating. In this case, even when the conventional element substrate is arranged at a desired height or position under heating during bonding, the height or the position of the conventional element substrate may change once the support member returns to room temperature and thermal deformation is eliminated. Particularly, if a resin member having a large linear expansion coefficient is used as the support member, larger deformation occurs and a resulting deviation also becomes larger.

There are techniques that makes it possible to align heights of ejection port formation surfaces of a plurality of conventional element substrates even when thermal deformation of a support member that occurs at a time of curing an adhesive is large. The technique suppresses a height deviation of the ejection port formation surfaces among the plurality of conventional element substrates by measuring in advance a height of the support member when it is thermally deformed, squashing the adhesive applied to the support member with the conventional element substrate, and arranging the conventional element substrate at a position where the thermal deformation is predicted. While the technique can suppress a deviation in a height direction and improve arrangement accuracy of the conventional element substrate, it cannot suppress arrangement deviation and variation in a horizontal direction. Further, if the adhesive is not cured after the conventional element substrate is arranged on the support member in order to suppress thermal deformation of the support member, a deviation in position or height may occur due to the conventional element substrate's own weight.

SUMMARY

The present disclosure is directed to the provision of a liquid ejection head in which an element substrate is bonded to a support member with high arrangement accuracy and a method for manufacturing the same.

According to an aspect of the present disclosure, a method for manufacturing a liquid ejection head that includes an ejection unit including an element substrate provided with a plurality of ejection ports configured to eject liquid, and a support member configured to support the ejection unit with a support surface and provided with a supply path for supplying liquid to the element substrate, the method includes when viewed from a direction perpendicular to the support surface, arranging a first adhesive, that is a thermosetting-type adhesive, to surround the supply path of the support member and arranging a second adhesive, that is an ultraviolet (UV) curable adhesive, in each of at least three of four areas obtained by dividing an area where the ejection unit is in contact with the support surface in the element substrate by a first straight line connecting respective centers of two sides facing each other in a first direction and a second straight line connecting respective centers of two sides facing each other in a second direction at a position overlapping an outer periphery of the area where the ejection unit is in contact with the support surface, arranging the ejection unit on the support surface and curing the second adhesive, and curing the first adhesive in this order.

Further features of the present disclosure will become apparent from the following description of exemplary embodiments with reference to the attached drawings.

DESCRIPTION OF THE EMBODIMENTS

Exemplary embodiments of the present disclosure will be described below with reference to the attached drawings. However, the scope of the present disclosure is determined based on the appended claims, and the following descriptions are not intended to limit the scope of the present disclosure. Particularly, the number, arrangement, and the like of element substrates described below do not limit the scope of the present disclosure. A liquid ejection head according to the present exemplary embodiment is an ink jet head to be mounted on a printer, and liquid to be ejected is ink, but the present disclosure can be widely applied to a liquid ejection head that ejects liquid. In the following descriptions and the attached drawings, an X direction is an array direction of a recording element substrate, a Y direction is a direction parallel to an ejection port formation surface and orthogonal to the X direction, and a Z direction is a direction orthogonal to the ejection port formation surface and is orthogonal to the X direction and the Y direction.

Figure 1A:
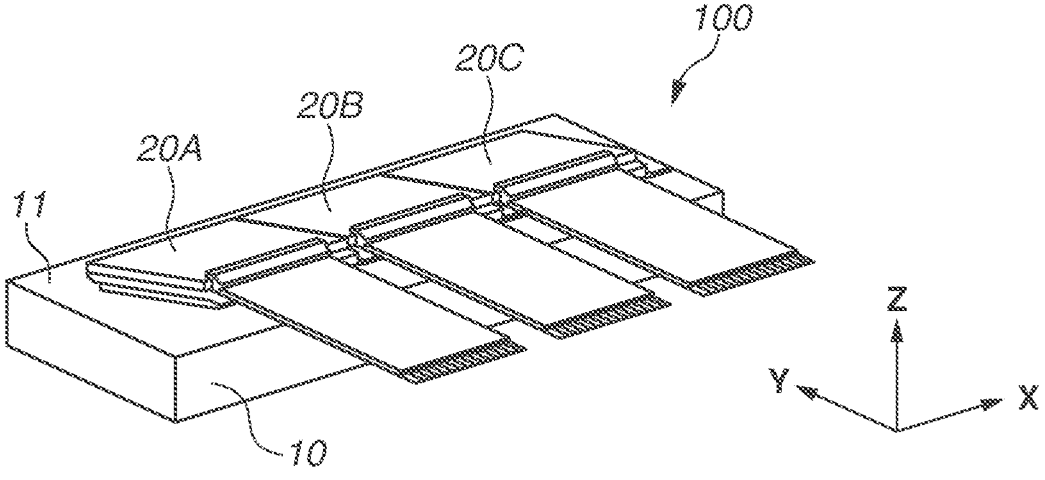
FIG. 1A is a perspective view of a liquid ejection head according to a first exemplary embodiment.
Figure 1B:
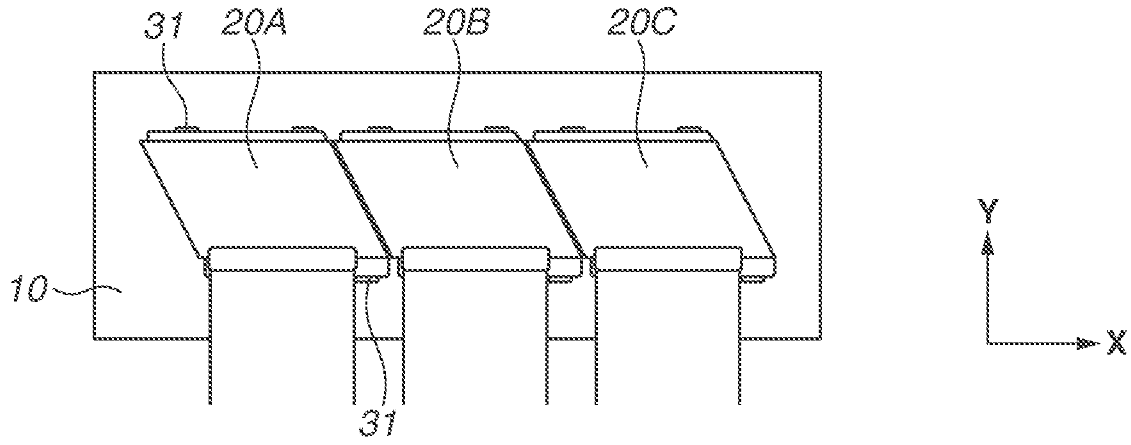
FIG. 1B is a top view of the liquid ejection head according to the first exemplary embodiment.
Figure 1C:
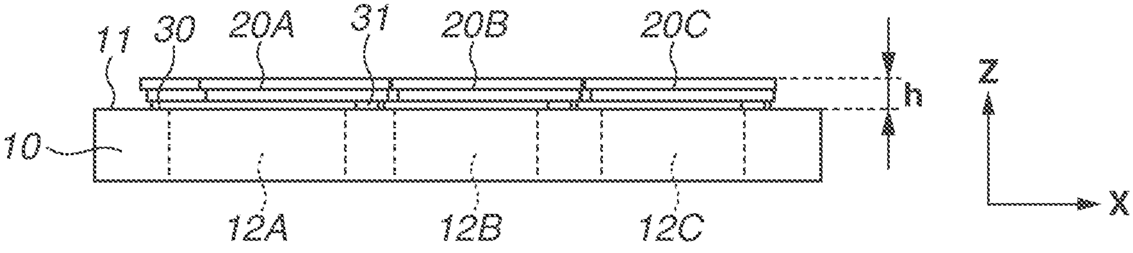
FIG. 1C is a side view of the liquid ejection head according to the first exemplary embodiment.

FIGS. 1A to 1C illustrate a liquid ejection head 100 according to a first exemplary embodiment. FIGS. 1A, 1B, and 1C are a perspective view, a top view viewed from a −Z direction, and a side view viewed from the Y direction, respectively. The liquid ejection head 100 includes a support member 10 and ejection units 20 (20A, 20B, and 20C) mounted on the support member 10. The support member 10 is a plate-shaped member and may be configured with a single member or simple shaped plates laminated in the X direction.

The support member 10 has a mounting surface (support surface) 11 on which the ejection units 20 are mounted, and supply paths 12A, 12B, and 12C are respectively formed at positions facing the ejection units 20A, 20B, and 20C. The supply paths 12 (12A, 12B, and 12C) are through holes included in the support member 10 for supplying ink to the ejection units 20. In FIGS. 1A to 1C, the ejection units 20A, 20B, and 20C are arranged in a straight line on the mounting surface 11 of the support member 10 so that their short sides are adjacent to each other in the X direction, but arrangement of the ejection units 20A, 20B, and 20C is not limited to this. For example, the present disclosure can also be suitably applied to a liquid ejection head in which the ejection units 20 are in a staggered arrangement on the mounting surface 11.

Figure 2:
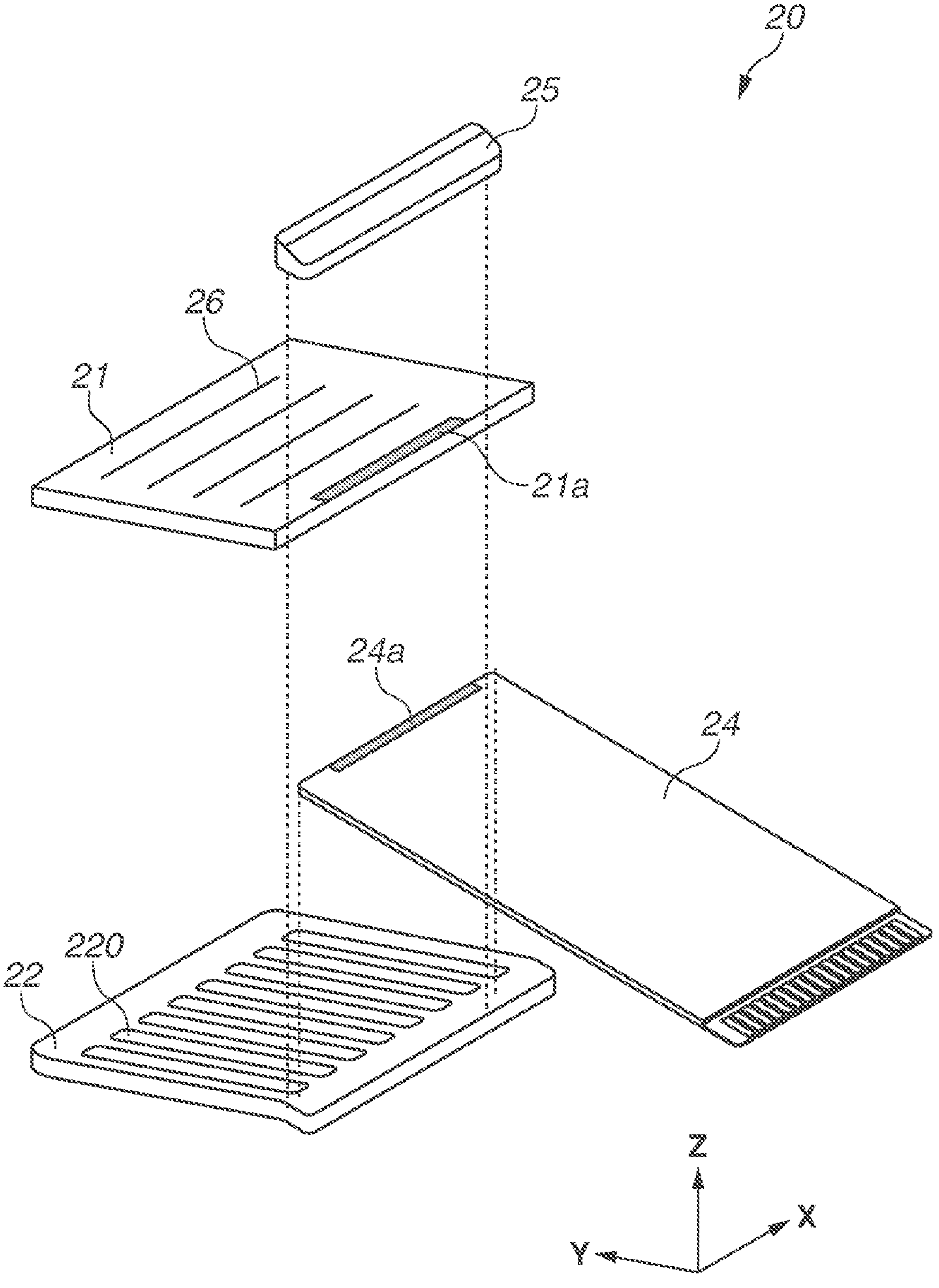
FIG. 2 is an exploded perspective view of an ejection unit according to the first exemplary embodiment.

FIG. 2 is an exploded perspective view of the ejection unit 20. The ejection unit 20 has a configuration in which an element substrate 21 and an electric wiring board 24 are bonded onto a flow path member 22 provided with communication ports 220, and a sealing member 25 seals an electrical connection portion in which a terminal 21*a* on the element substrate 21 and a terminal 24*a* on the electric wiring board 24 are electrically connected. The flow path member 22 is a support body that supports the element substrate 21 and also a flow path member that fluidly communicates the element substrate 21 and the support member 10.

Thus, it is desirable that the flow path member 22 has high flatness and can be bonded to the element substrate 21 with sufficiently high reliability. It is desirable that a material of the flow path member 22 is, for example, alumina and a resin material. The ejection unit 20 according to the present exemplary embodiment may have a configuration in which the element substrate 21 and the electric wiring board 24 are bonded together without using the flow path member 22. The element substrate 21 includes a plurality of ejection ports 26 for ejecting ink and an energy generating element (not illustrated) that generates energy to eject liquid from the ejection port on a surface opposite to a surface facing the mounting surface 11 of the support member 10.

Figure 3:
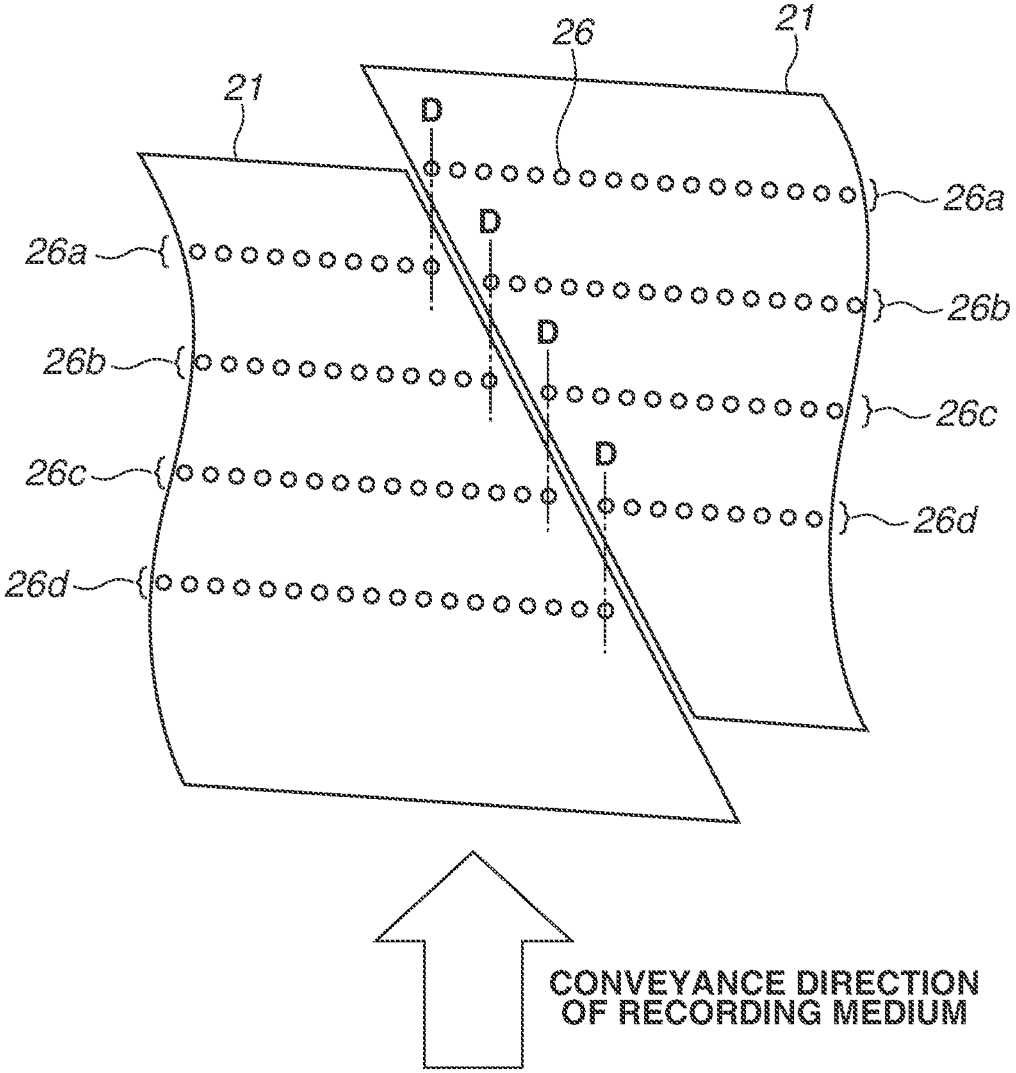
FIG. 3 is a partially enlarged plan view of an adjacent portion between element substrates according to the first exemplary embodiment.

FIG. 3 is a partially enlarged plan view illustrating an adjacent portion between the element substrates 21 in two adjacent ejection units 20. As illustrated in FIGS. 1A to 1C and 2, according to the present exemplary embodiment, a recording element substrate having a substantially parallelogram outer shape is used. As illustrated in FIG. 3, each ejection port array (26*a* to 26*d*) in which the ejection ports 26 are arranged on each element substrate 21 is arranged to be inclined at a certain angle with respect to a conveyance direction of a recording medium such as paper. Accordingly, at least one ejection port in the ejection port array overlaps in the conveyance direction of the recording medium in the adjacent portion between the element substrates 21. In FIG. 3, two ejection ports on lines D overlap each other. With this arrangement, even if a position of the element substrate 21 deviates somewhat from a predetermined position, it is possible to make black streaks and white spots in a recorded image less noticeable by controlling drive of the overlapping ejection ports. In other words, even if a plurality of the element substrates 21 is arranged in a straight line (in-line) instead of in a staggered arrangement, it is possible to take a measure against black streaks and white spots at a joint portion between the element substrates 21 while suppressing an increase in a length of the liquid ejection head 100 in the conveyance direction of the recording medium. According to the present exemplary embodiment, a main plane of the element substrate 21 is a parallelogram, but the present disclosure is not limited to this. For example, the configuration of the present disclosure can be suitably applied even when a rectangular, trapezoidal, or other shaped recording element substrate is used. Square or rectangular shaped element substrates 21 may be arranged in a staggered manner so that the ejection ports 26 overlap in the conveyance direction of the recording medium.

Figure 4:
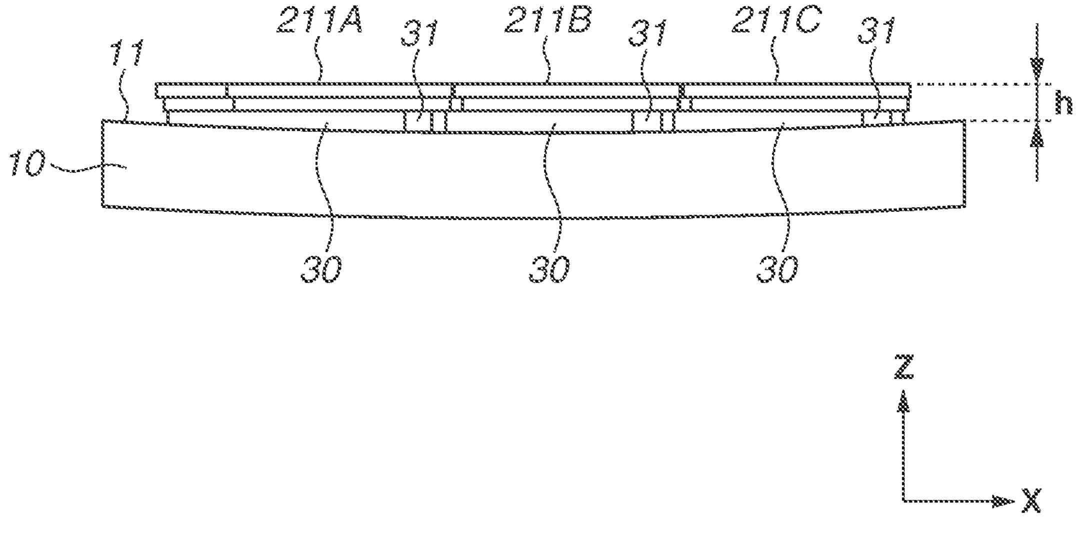
FIG. 4 is a side view of the liquid ejection head according to the first exemplary embodiment.

FIG. 4 illustrates a side view of the liquid ejection head 100 in a room temperature state (for example, about 10 to 30° C., which is environmental temperature at which a printer is generally used). The electric wiring board 24 is omitted in FIG. 4. In FIG. 4, the support member 10 is warped such that the mounting surface 11 side is concave. If the support member 10 is made of a resin, warpage is particularly likely to occur. According to the present exemplary embodiment, as an example, modified polyphenylene ether (modified PPE) is used as the support member 10 because it has low mold shrinkage, high dimensional stability, and excellent flame retardancy. At this time, a maximum warpage of the support member 10 made of modified PPE having a linear expansion coefficient of about $2.4*10^{-5}$ mm/mm/° C. is about 0.1 mm in the Z direction. If there is a difference in the height of the mounting surface 11 in the Z direction, positional accuracy of the element substrate 21 on the support member 10 may decrease in a case where the element substrates 21 are arranged adjacent to each other at high density as illustrated in FIGS. 1A to 1C and FIG. 4. Thus, a height of a first adhesive 30, which is a resin that bonds the support member 10 and the element substrate 21, in the Z direction is adjusted so that a height from a reference of the support member 10 (here, a corner of a support substrate) to ejection port formation surfaces 211 (211A, 211B, and 211C) of the respective element substrates 21 (21A, 21B and 21C) is maintained at a constant height h. Accordingly, even when the support member 10 is warped, the ejection port formation surfaces of the element substrates 21A, 21B, and 21C are on the same horizontal plane, and recording quality can be improved.

Figure 5A:
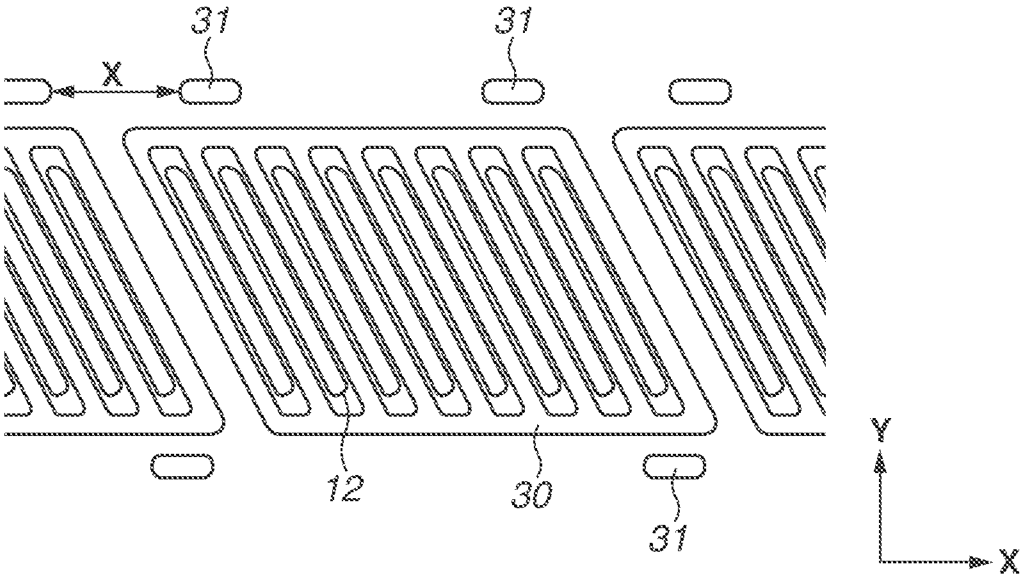
FIG. 5A illustrates an application pattern of an adhesive according to the first exemplary embodiment.
Figure 5B:
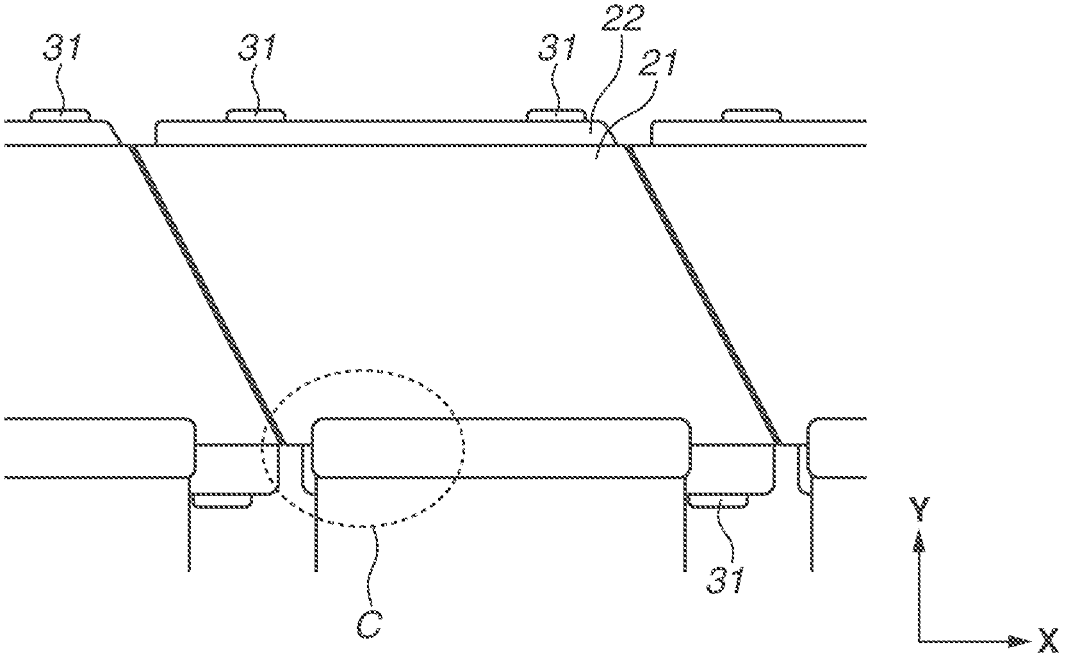
FIG. 5B is a top view of the liquid ejection head according to the first exemplary embodiment.

FIG. 5A illustrates an application pattern of an adhesive that bonds the support member 10 and the ejection unit 20. FIG. 5B is a top view of a state in which the support member 10 is bonded to the ejection unit 20. As illustrated in FIG. 5A, the first adhesive 30 is arranged along the supply path 12. The first adhesive 30 is required to have ink resistance because it comes into contact with ink, and is desirably a thermosetting-type adhesive with high ink resistance. According to the present exemplary embodiment, as an example, an epoxy resin-based thermosetting-type adhesive with a viscosity of 60 to 110 Pa·s is used as the first adhesive 30. The thermosetting-type adhesive only needs to include at least a thermosetting component.

As described above, the height in the Z direction of the first adhesive 30 that bonds the support member 10 and the element substrate 21 is adjusted so that the height from the reference of the support member 10 to the ejection port formation surfaces 211 of the respective element substrates 21 is maintained at the constant height h. Thus, even when the mounting surface 11 of the support member 10 is warped, it is possible to improve arrangement accuracy in a height direction of the ejection unit 20 on the support member 10. On the other hand, arrangement deviation and variation of the element substrate may occur in the horizontal direction. In addition, if a time from arranging the ejection unit 20 on the support member 10 to curing the first adhesive 30 is long, a height deviation may occur due to an own weight of the ejection unit 20. Further, in a case where a thermosetting resin with high ink resistance is used as the first adhesive 30, if the element substrate is fixed to the support member largely warped due to heating during curing, and then the support member returns to room temperature and the warp becomes smaller, the height of the element substrate may change.

Thus, as illustrated in FIGS. 5A and 5B, a second adhesive 31 (a second resin) is arranged in addition to the first adhesive 30 according to the present disclosure. Here, "a vicinity of a vertex" means an area that is closer to a corner of the element substrate 21 than a distance to respective centers of two sides forming that corner in a plan view of the element substrate 21.

It is desirable that the second adhesive 31 is cured at a temperature lower than that of the first adhesive 30 and is a room temperature curable adhesive. By using the second adhesive 31, it becomes possible to fix the position of the ejection unit 20 without thermally deforming the support member 10 before the first adhesive 30 is cured while the supply paths 12 of the support member 10 and the communication ports 220 of the ejection unit 20 are fluidly communicated using the first adhesive 30, which is a thermosetting-type adhesive with high ink resistance. The second adhesive 31 is desirably an ultraviolet (UV) curable adhesive that is cured by UV irradiation among room temperature curable adhesives. According to the present exemplary embodiment, as an example, a UV curable adhesive, which is cured by UV irradiation of approximately 6000 mJ/cm$^2$, is used as the second adhesive 31. The UV curable adhesive only needs to include at least a photo curable component.

As illustrated in FIGS. 5A and 5B, it is desirable that the second adhesive 31 is arranged in the vicinity of at least three of four vertices of the element substrate 21 and at a position overlapping an outer periphery of an area where the ejection unit 20 is in contact with the support member 10 when viewed from a direction perpendicular to the support member 10. As another way to describe the arrangement of the second adhesive 31, it is desirable that the second adhesive 31 is arranged in each of at least three of four areas obtained by dividing the area by a first straight line connecting respective centers of two sides facing in a first direction and a second straight line connecting respective centers of two sides facing in a second direction at the position overlapping the outer periphery of the area where the ejection unit 20 is in contact with the support member 10 in a plan view of the element substrate 21. If the second adhesive 31 is a UV curable adhesive, it is desirable that the second adhesive 31 has both a portion that overlaps with the area and a portion that is exposed from the ejection unit 20 when the support member 10 is viewed from a liquid ejection direction. Due to the exposed portion, second adhesive 31 can be effectively cured by UV irradiation.

Figure 6:
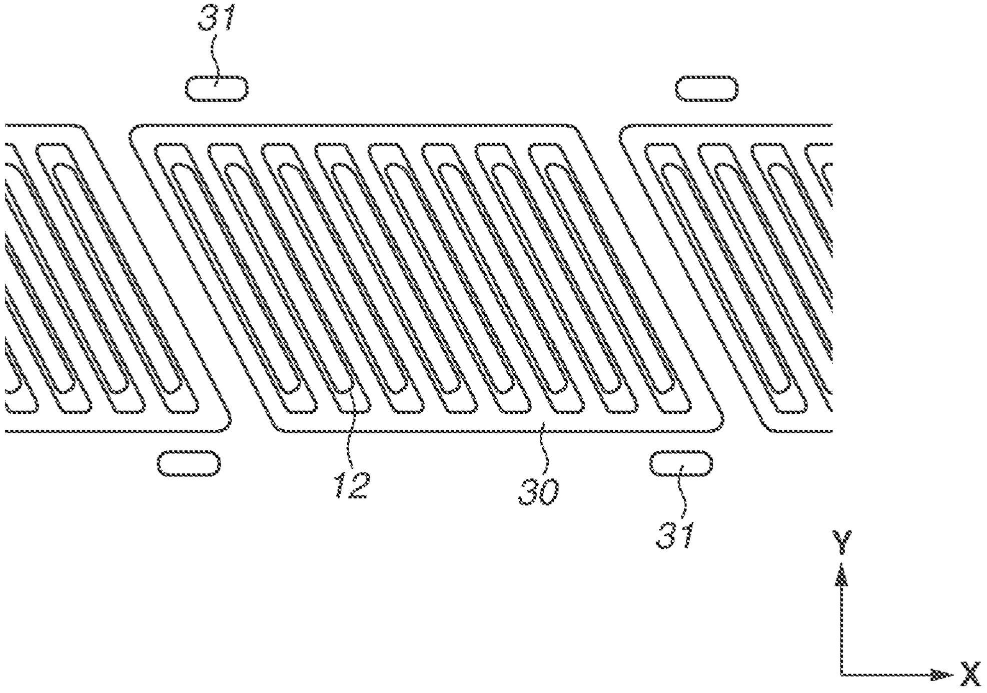
FIG. 6 illustrates an application pattern of an adhesive according to a comparative example.

As in a comparative example illustrated in FIG. 6, if the second adhesive 31 is arranged only at two vertices of the element substrate 21, it is highly possible that the ejection unit 20 moves due to its own weight before the first adhesive 30 is thermally cured and cannot be maintained in a desired height and a position. As illustrated in FIG. 5A, the second adhesive 31 is arranged in the vicinity of at least three vertices, so that the height and the position of the ejection unit 20 can be sufficiently maintained until the first adhesive 30 is thermally cured. The second adhesive 31 may be arranged in the vicinity of all of the four vertices of the element substrate 21, but by arranging the second adhesive 31 in the vicinity of at least three vertices, the effect of the present disclosure can be achieved while minimizing an amount of the adhesive used and an arrangement space.

Further, as illustrated in FIGS. 1B and 5B, the second resins 31 are arranged in a direction facing each other across the element substrate 21. The second resins 31 are arranged in this manner, so that a plurality of the element substrates 21 can be arranged closely adjacent to each other on the support member 10, which is desirable for improving image quality of a recorded image.

According to the present exemplary embodiment, the element substrate 21 has a parallelogram shape, and the electric wiring board 24 is arranged on a left side with respect to one side of the element substrate 21 having the terminals 21*a*. In other words, the center of the electrical connection portion connecting the element substrate 21 and the electric wiring board 24 is arranged to be shifted from the center of one side of the element substrate 21. At this time, one of the four vertices of the area where the ejection unit 20 is in contact with the support member 10 has no space to arrange the second adhesive 31 due to the presence of the electric wiring board 24 (an area C illustrated in FIG. 5B). Even with this configuration, according to the present disclosure, the second adhesive 31 is arranged and cured in the vicinity of the three vertices of the element substrate 21, and thus it is possible to sufficiently achieve the effect to improve the arrangement accuracy of the ejection unit 20.

Figure 7:
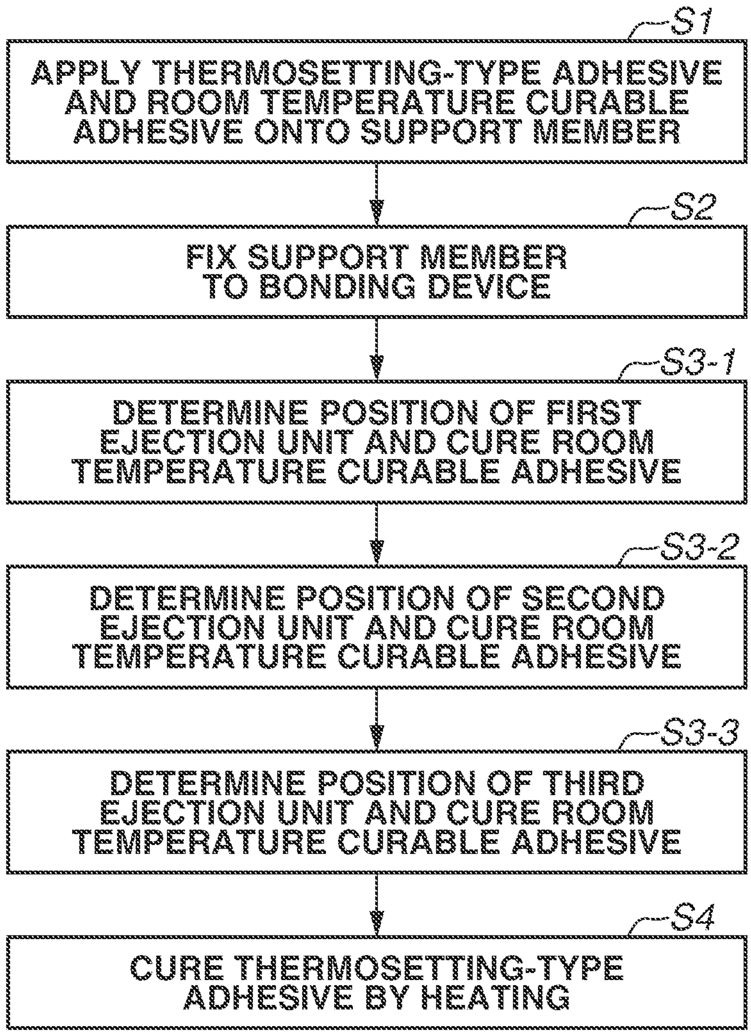
FIG. 7 is a flowchart illustrating bonding processes of the element substrate to a support member according to the first exemplary embodiment.

Next, a method for bonding the ejection units (20A, 20B, and 20C) to the support member 10 is described with reference to FIGS. 7 to 9. The bonding method in a case where three ejection units are mounted on the support member is described below, but the number of the ejection units to be mounted on the support member is not limited to three. FIG. 7 is a flowchart illustrating the method for bonding the ejection units 20 to the support member 10 according to the present exemplary embodiment. FIGS. 8A to 8E illustrate each step of bonding the ejection unit 20.

Figure 8A:
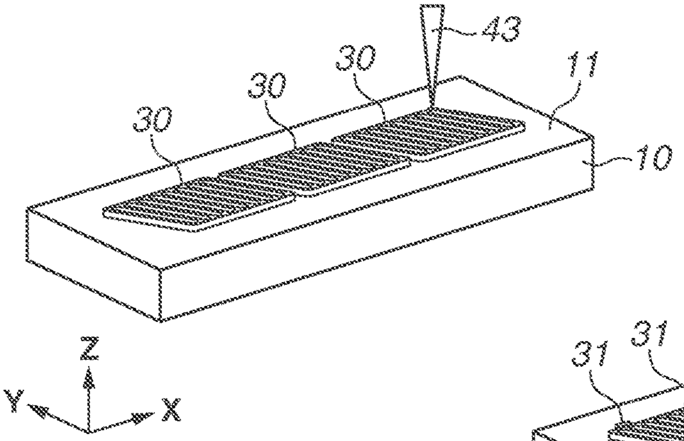
FIGS. 8A and 8B are perspective views illustrating a part of the bonding processes of the element substrate to the support member according to the first exemplary embodiment.
Figure 8B:
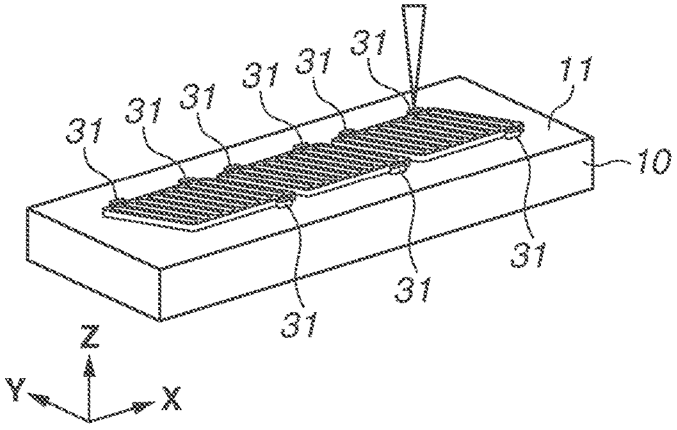
Figure 9:
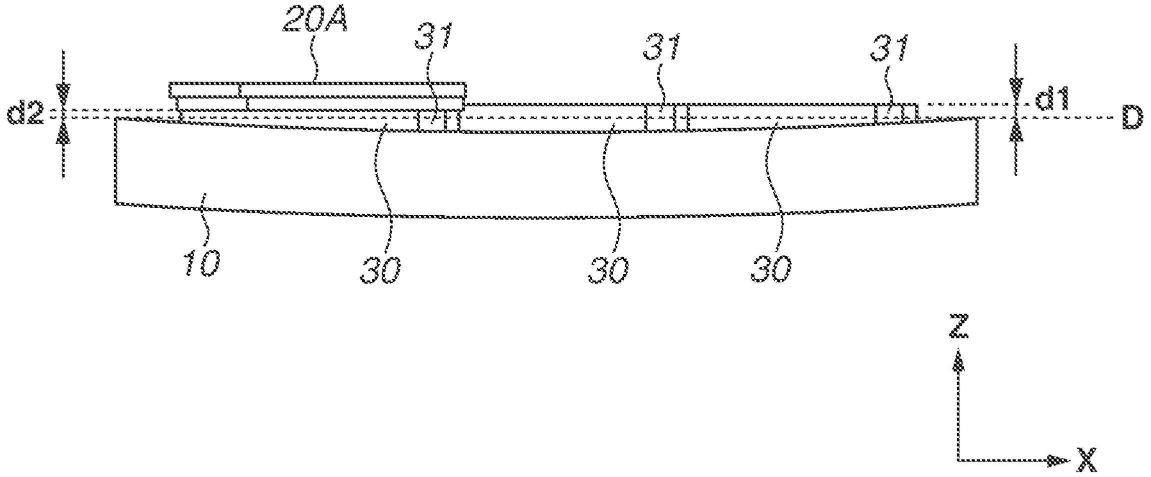
FIG. 9 is a side view illustrating a part of the bonding processes of the element substrate to the support member according to the first exemplary embodiment.

First, in step S1, the first adhesive 30 and the second adhesive 31 are applied onto the mounting surface 11 of the support member 10 using a needle 43 or the like as illustrated in FIGS. 8A and 8B. According to the present exemplary embodiment, the first adhesive 30 is applied (FIG. 8A), and then the second adhesive 31 is applied (FIG. 8B), but the order of applying the two adhesives may be reversed. As illustrated in FIG. 5A, the first adhesive 30 is applied around the supply paths 12 of the support member 10, and the second adhesive 31 is applied to the area where the ejection unit 20 is in contact with the support member 10 and in the vicinity of three of the four vertices of the area where the first adhesive 30 is applied. Here, the first adhesive 30 and the second adhesive 31 are applied so that a height from a reference surface D of the support member 10 is d1 (see FIG. 9). The height d1 may be set to be larger than a maximum amount of warpage of the support member 10.

Figure 8C:
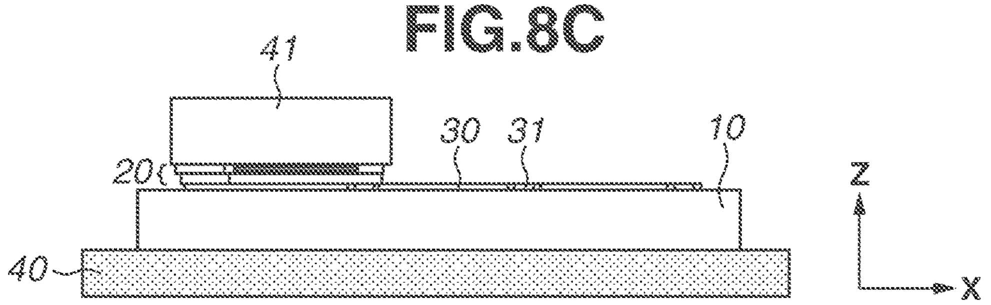
FIGS. 8C and 8D are side views illustrating a part of the bonding processes of the element substrate to the support member according to the first exemplary embodiment.
Figure 8D:
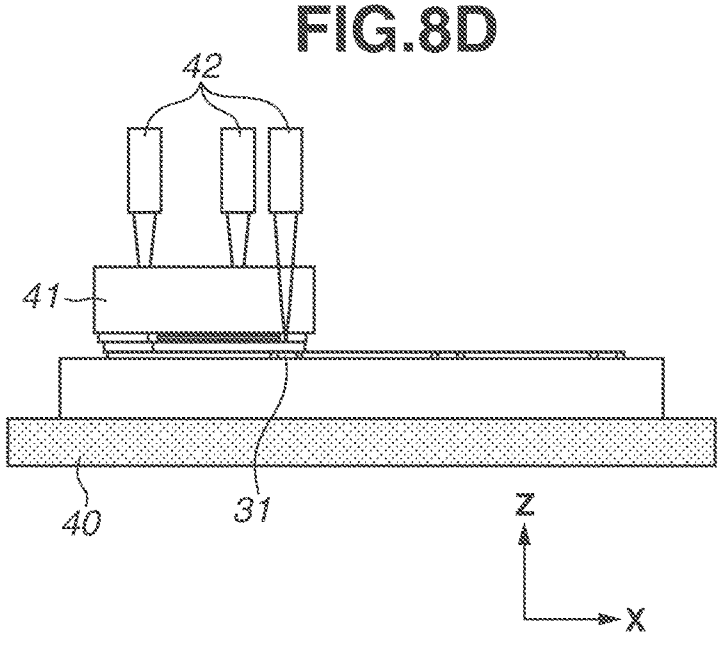
Figure 8E:
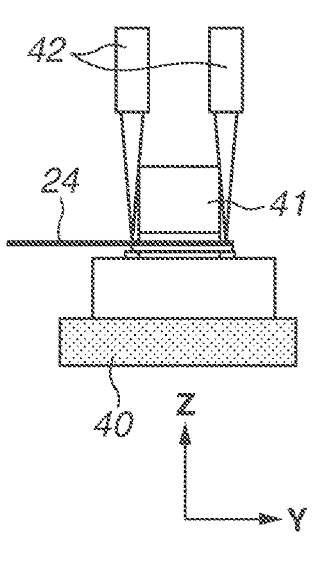
FIG. 8E is a side view of FIG. 8D.

Next, in step S2, the support member 10 to which the first adhesive 30 and the second adhesive 31 are applied is fixed to a bonding device 40 as illustrated in FIG. 8C. Then, in step S3-1, the second adhesive 31 in contact with the ejection unit 20A is cured by UV irradiation by a UV unit 42 as illustrated in FIGS. 8D and 8E in a state in which the ejection unit 20A is arranged using a finger 41 so that a distance from a bonding surface between the ejection unit 20A and the support member 10 to the reference surface D is d2 (d2<d1) (see FIG. 9). FIG. 8E is a side view viewed from the X direction. In order to suppress the height deviation of the ejection unit, it is more desirable to simultaneously irradiate and cure the second adhesives 31 arranged at three locations with UV light. Thus, it is desirable that an application size of the second adhesive 31 arranged in the vicinity of each vertex is within an irradiation range of the UV unit 42, such as a spot UV irradiation device, as illustrated in FIGS. 8D and 8E. FIG. 9 is a side view of the ejection unit 20A bonded onto the support member 10.

Similarly, in step S3-2, the second adhesive 31 in contact with the ejection unit 20B is cured by UV irradiation in a state in which the ejection unit 20B is arranged by the finger 41 so that a distance from a bonding surface between the ejection port formation surface 211B and the support member 10 to the reference surface D is d2, that is the same height as the first ejection unit 20A. Further, in step S3-3, the ejection unit 20C is arranged in the same manner as the ejection units 20A and 20B, and the second adhesive 31 in contact with the ejection unit 20C is cured by UV irradiation. As described above, all of the ejection units 20 (20A, 20B, and 20C) mounted on the support member 10 are temporarily fixed with the second adhesive 31 in order from an end.

In a case where the ejection units 20 are fixed one by one from the end by curing the second adhesive 31 as according to the present exemplary embodiment, there is a concern that the second adhesive 31 for fixing the adjacent ejection unit 20 is irradiated with the UV light, and the ejection unit 20 may be fixed at an unintended position or timing. Thus, it is desirable that a distance x between adjacent second adhesives 31 is 5 mm or more (see FIG. 5A). In other words, it is desirable that the distance x between the second resins provided corresponding to each of the adjacent ejection units is 5 mm or more.

Next, in step S4, the support member 10 to which the ejection units 20 are fixed is taken out from the bonding device 40 and then input into an environment where the first adhesive 30 is cured, such as an oven, to cure the first adhesives 30 all at once.

According to the present disclosure, the ejection units 20 are fixed to the support member 10 using the second adhesive 31, which is a UV curable adhesive or the like, before the first adhesive 30, which is a thermosetting-type adhesive, is cured. Thus, compared with a case where the adhesive (the first adhesive 30) corresponding to each ejection unit is heated and cured in sequence without using the second adhesive 31, it is possible to suppress a variation in the height of the ejection port formation surface 211 of the ejection unit 20 due to thermal deformation of the support member 10 and a positional deviation caused by bonding the ejection unit 20 to the support member 10, which is in the thermally deformed state. Particularly, in the liquid ejection head in which a plurality of the ejection units 20 is mounted on the support member 10, accuracy of relative positions between the plurality of the ejection units 20 can be improved.

According to exemplary embodiments described below, differences from the above-described first exemplary embodiment are mainly described, and descriptions of parts similar to those of the above-described configuration are omitted.

Figure 10:
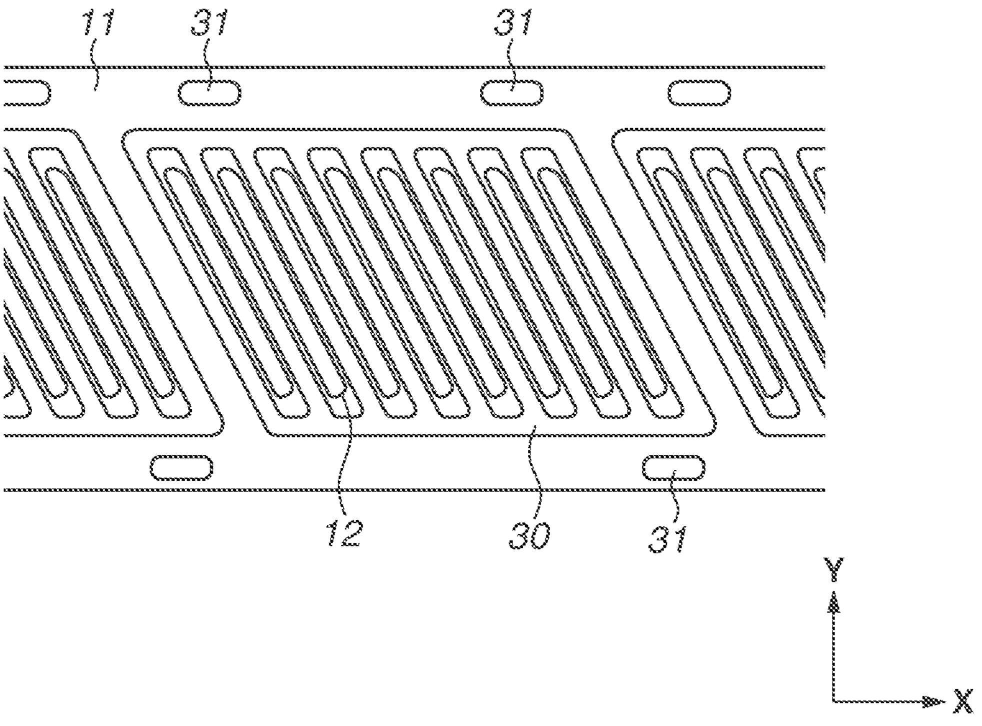
FIG. 10 illustrates an application pattern of an adhesive according to a second exemplary embodiment.

FIG. 10 illustrates an application pattern of an adhesive onto a support member 10 according to a second exemplary embodiment.

Figure 11A:
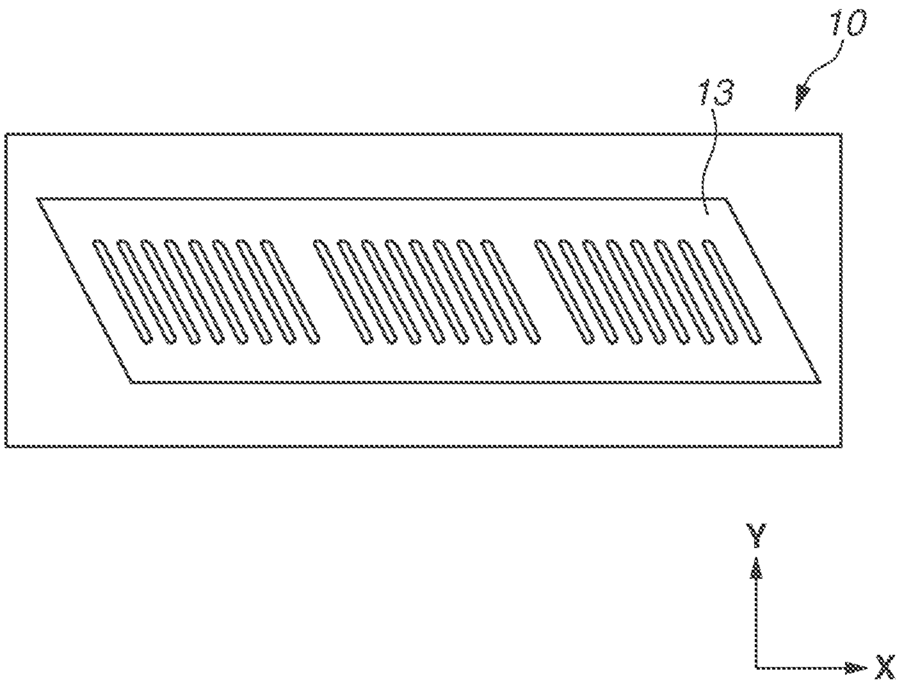
FIG. 11A is a top view of a support member according to the second exemplary embodiment.
Figure 11B:
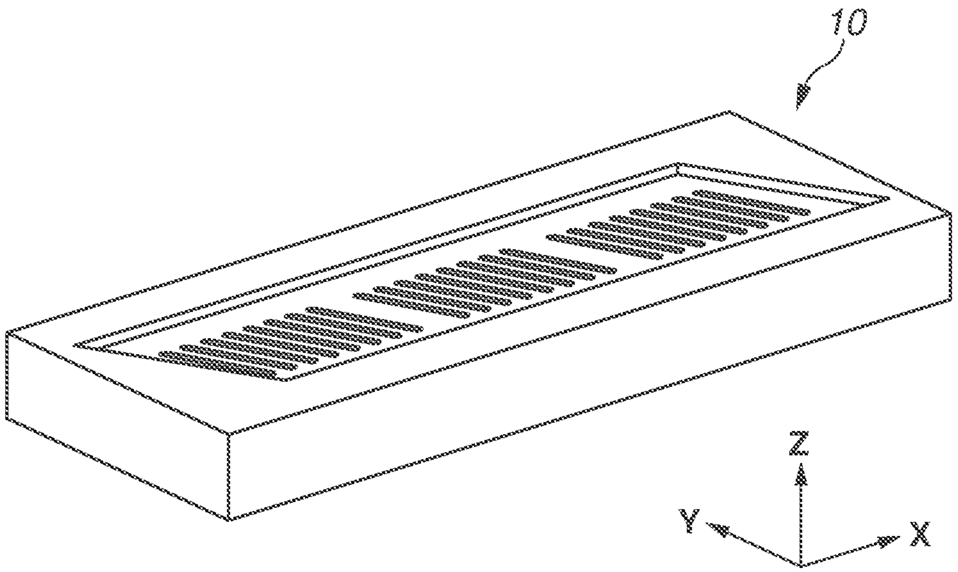
FIG. 11B is a perspective view of the support member according to the second exemplary embodiment.

FIGS. 11A and 11B are respectively a top view and a perspective view of the support member 10 according to the second exemplary embodiment. As illustrated in FIGS. 11A and 11B, the support member 10 according to the present exemplary embodiment has a concave portion 13 for mounting an ejection unit 20, and a second adhesive 31 is surrounded by a wall surface of the concave portion 13 of the support member 10 and a first adhesive 30. Accordingly, even when viscosity of the second adhesive 31 is low, an effect of securing an adhesive application height d1 can be achieved.

Figure 12A:
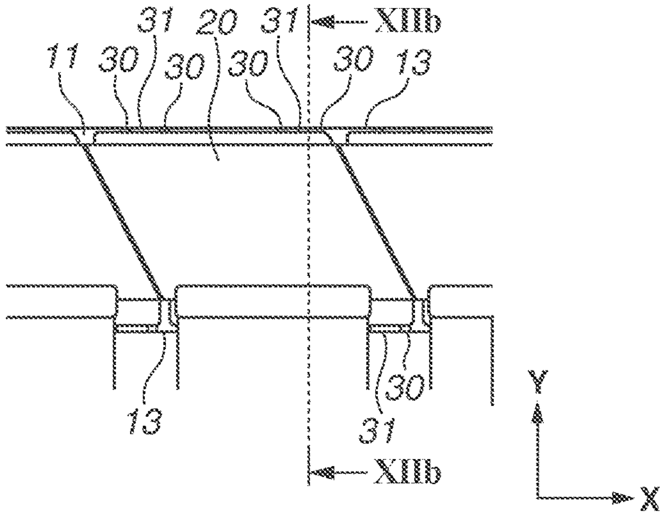
FIG. 12A illustrates a liquid ejection head according to a third exemplary embodiment.
Figure 12B:
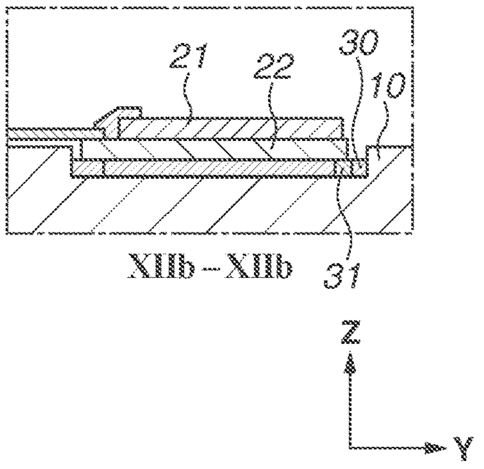
FIG. 12B is a cross-sectional view along a XIIb-XIIb line in FIG. 12A.
Figure 12C:
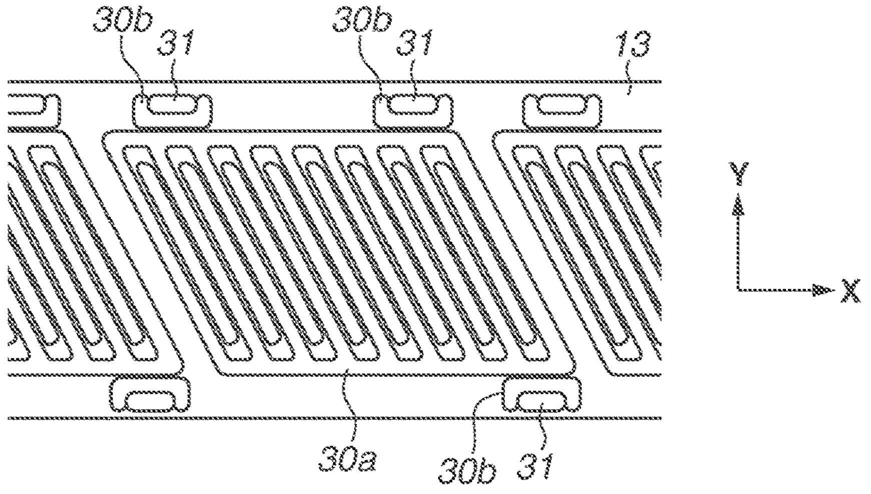
FIGS. 12C and 12D illustrate application patterns of an adhesive according to the third exemplary embodiment.
Figure 12D:
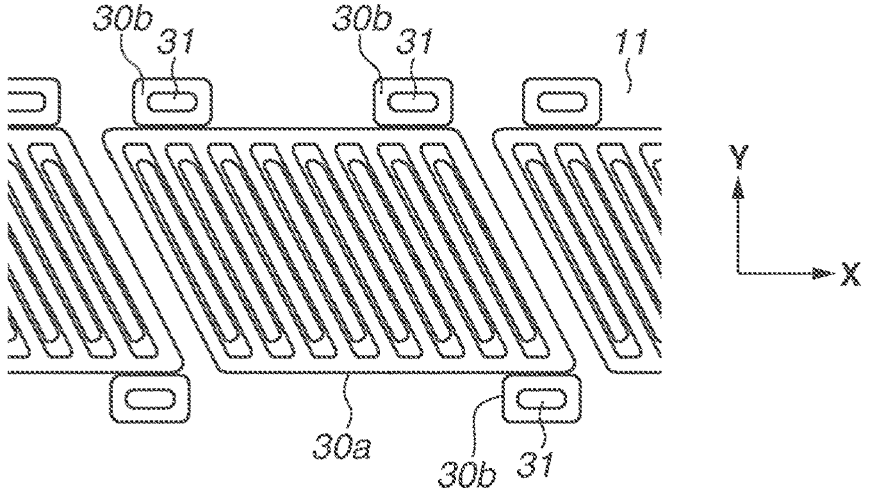

FIG. 12A is a top view of a liquid ejection head 100 as an example according to a third exemplary embodiment. FIG. 12B is a cross-sectional view taken along a XIIb-XIIb line in FIG. 12A. FIG. 12C illustrates an example of an arrangement pattern of adhesives on a support member 10 in the liquid ejection head 100 illustrated in FIG. 12A. According to the present exemplary embodiment, a first adhesive 30*b* is arranged to surround each of second adhesives 31 in addition to a first adhesive 30*a* surrounding supply paths 12. Accordingly, even when viscosity of the second adhesive 31 is low, an effect of securing an adhesive application height d1 can be achieved. In FIG. 12C, the first adhesive 30*b* is U-shaped, but it does not need to be U-shaped as long as it can surround the second adhesive 31. As illustrated in FIG. 12D, the first adhesive 30*b* may be arranged to surround an entire periphery of each second adhesive 31. In this case, even when a concave portion 13 is not formed in the support member 10 as in the liquid ejection head illustrated in FIG. 12D, an effect of easily securing the adhesive application height d1 can be achieved.

In manufacturing the liquid ejection head 100 according to the present exemplary embodiment, it is desirable to apply the first adhesive 30 onto a mounting surface 11 of the support member 10 and then apply the second adhesive 31.

Further, it is desirable that viscosity of the first adhesive 30 is higher than viscosity of the second adhesive 31.

According to the present exemplary embodiment, as an example, the viscosity of the first adhesive 30 at room temperature (25±1° C.) is 60 to 110 Pa·s, and the viscosity of the second adhesive 31 is 25 to 55 Pa·s. Further, from a viewpoint of application onto the support member 10, it is more desirable that the first adhesive 30 has a thixotropic property.

In FIGS. 12A to 12C, the support member 10 has the concave portion 13 as in the second exemplary embodiment, and the second adhesive 31 is surrounded by the wall surface of the concave portion 13 and the first adhesive 30.

In this case, the configuration is desirable because it is possible to effectively achieve the effect of securing the height of the second adhesive 31 with a smaller space and a less amount of the first adhesive 30*c* compared with the configuration in FIG. 12D. Of course, the first adhesive 30*b* may be arranged to surround the entire periphery of each second adhesive 31 as in FIG. 12D in the liquid ejection head in which the support member 10 has the concave portion 13.

Figure 13:
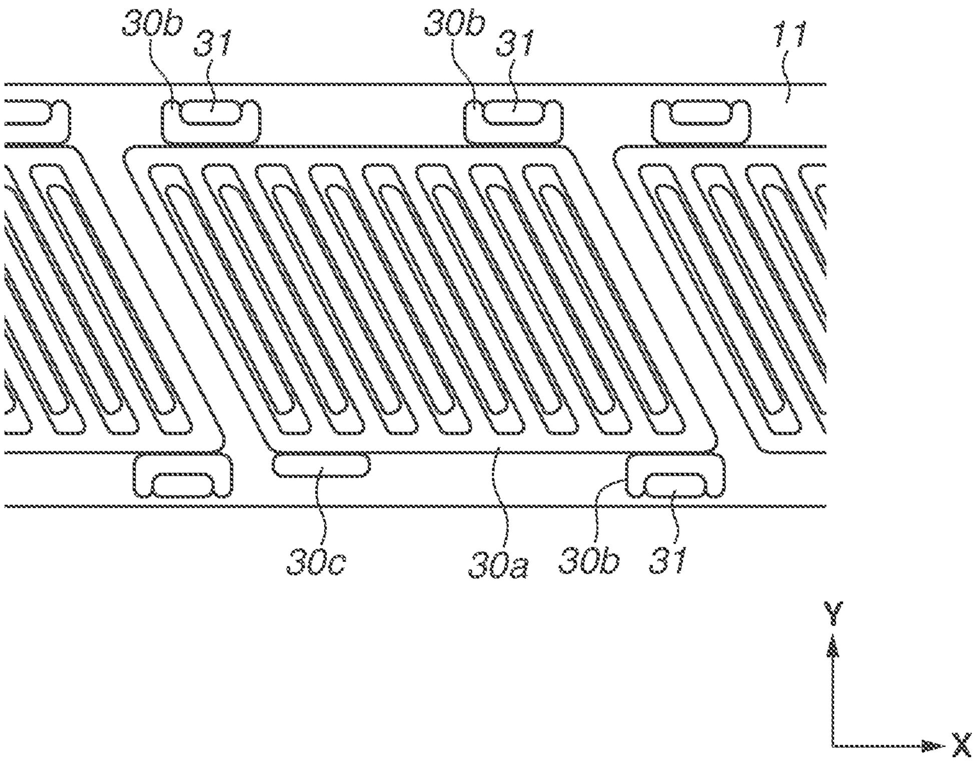
FIG. 13 illustrates an application pattern of an adhesive according to a fourth exemplary embodiment.

FIG. 13 illustrates an application pattern of an adhesive onto a support member 10 according to a fourth exemplary embodiment. According to the present exemplary embodiment, as in the third exemplary embodiment, a first adhesive 30*b* is arranged around a second adhesive 31, and further, a first adhesive 30*c* is arranged in a vicinity of a vertex to which the second adhesive 31 is not applied among four vertices of an ejection unit 20. A shape of the first adhesive 30 may be a linear shape as illustrated in FIG. 13, a U-shape similar to the first adhesive 30*b*, or an arbitrary shape.

If there is a linear expansion difference between the support member 10 and a flow path member 22 of the ejection unit 20, a following issue may occur if the first adhesive 30 is cured in a case where the first adhesive 30*b* is arranged to surround the second adhesive 31 as illustrated in FIGS. 12A to 12D and 13. The ejection unit 20 on the support member 10 may shift in a parallel direction due to the first adhesive 30*b* being arranged only in the vicinity of three of the four vertices of the ejection unit 20, in other words, the first adhesive 30*b* being arranged asymmetrically with respect to the ejection unit 20. As an example where there is a linear expansion difference between the support member 10 and the flow path member 22 of the ejection unit 20, there is a case where modified PPE with a linear expansion coefficient of about $2.4*10^{-5}$ mm/mm/° C. may be used for the support member 10, and alumina with a linear expansion coefficient of about $7.2*10^{-5}$ mm/mm/° C. may be used for the flow path member 22. In contrast, according to the present exemplary embodiment, symmetry of the arrangement of the first adhesive 30 with respect to the ejection unit 20 is improved by arranging the first adhesive 30*c*. Accordingly, even when the support member 10 and the flow path member 22 are thermally expanded due to heating for curing the first adhesive 30, stress caused by the linear expansion difference is dispersed in directions of the four vertices with respect to the flow path member 22, and it is possible to suppress deterioration of the arrangement accuracy of the ejection unit 20.

Figure 14:
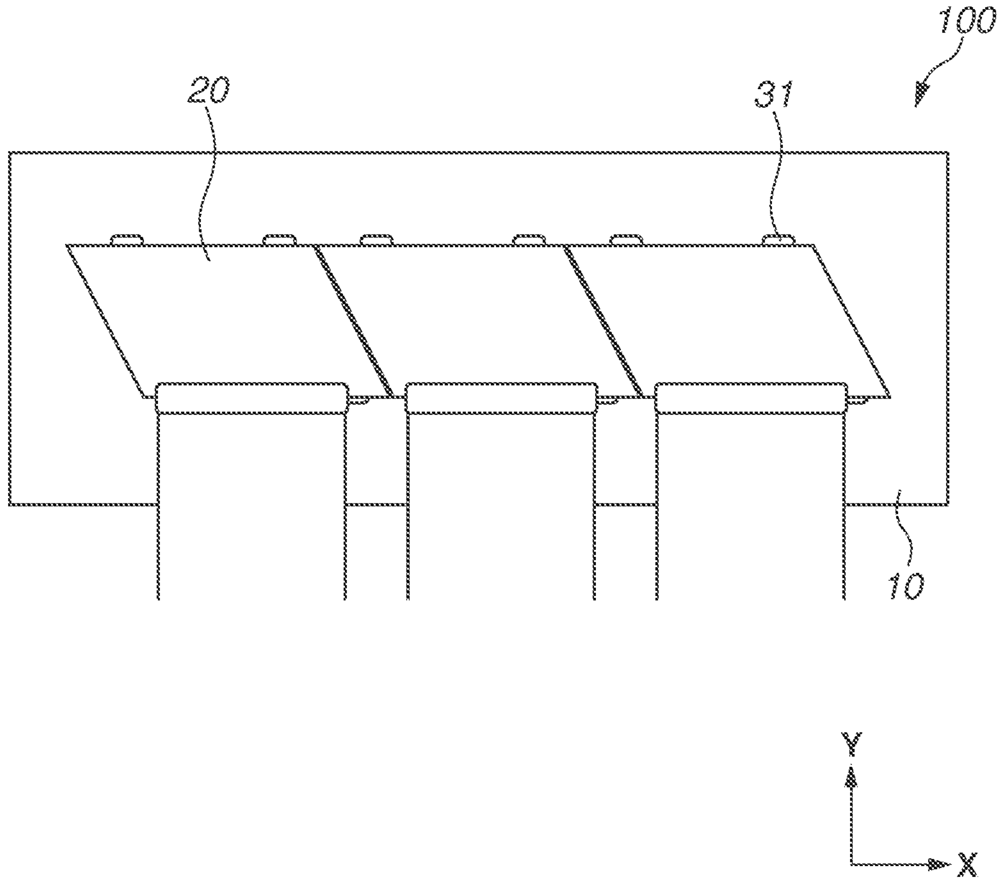
FIG. 14 illustrates a liquid ejection head according to a fifth exemplary embodiment.

FIG. 14 is a top view of a liquid ejection head 100 according to a fifth exemplary embodiment. According to the present exemplary embodiment, an element substrate 21 and an electric wiring board 24 are directly bonded to each other in an ejection unit 20, and the configuration does not include a flow path member 22. Even with this configuration, the present disclosure using a first adhesive and a second adhesive can be suitably applied.

According to the present disclosure, it is possible to provide a liquid ejection head in which an element substrate is bonded to a support member with high arrangement accuracy and a method for manufacturing the same.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-037171, filed Mar. 10, 2023, which is hereby incorporated by reference herein in its entirety.

What is claimed is:

1. A method for manufacturing a liquid ejection head that includes:

an ejection unit including an element substrate provided with a plurality of ejection ports configured to eject liquid, and a support member configured to support the ejection unit with a support surface and provided with a supply path for supplying liquid to the element substrate, the method comprising:

when viewed from a direction perpendicular to the support surface, arranging a first adhesive, that is a thermosetting-type adhesive, to surround the supply path of the support member and arranging a second adhesive, that is an ultraviolet (UV) curable adhesive, in each of at least three of four areas obtained by dividing an area where the ejection unit is in contact with the support surface in the element substrate by a first straight line connecting respective centers of two sides facing each other in a first direction and a second straight line connecting respective centers of two sides facing each other in a second direction at a position overlapping an outer periphery of the area where the ejection unit is in contact with the support surface;

arranging the ejection unit on the support surface and curing the second adhesive; and curing the first adhesive in this order, wherein the support member supports a plurality of the ejection units, wherein, in arranging the element substrate and curing the second adhesive, the second adhesive is arranged one by one in sequence for each of the ejection units to be cured, and wherein, in curing the first adhesive, curing is performed all at once on the plurality of the ejection units.

2. The method according to claim 1, wherein the support member is made of a resin.

3. The method according to claim 1, wherein the first adhesive is arranged, and then the second adhesive is arranged.

4. The method according to claim 1, wherein the second adhesive is arranged outside the first adhesive surrounding the supply path.

5. A liquid ejection head comprising:

an ejection unit including an element substrate provided with a plurality of ejection ports configured to eject liquid;

a support member configured to support the ejection unit with a support surface and provided with a supply path for supplying liquid to the element substrate;

a first resin that is arranged to surround the supply path of the support member; and a second resin, wherein, when viewed from a direction perpendicular to the support surface, the support member and the ejection unit are bonded via the first resin and the second resin, wherein the second resin is different from the first resin and is arranged in each of at least three of four areas obtained by dividing an area where the ejection unit is in contact with the support member in the element substrate by a first straight line connecting respective centers of two sides facing each other in a first direction and a second straight line connecting respective centers of two sides facing each other in a second direction at a position overlapping an outer periphery of the area where the ejection unit is in contact with the support member, wherein the ejection unit further includes a flow path member configured to support the element substrate and fluidly communicate the element substrate and the support member, wherein the support member is made of a resin, and the flow path member is made of alumina, wherein the support member includes a concave portion, and the ejection unit is arranged in the concave portion, and wherein the second resin is surrounded by the first resin and a wall surface of the concave portion of the support member.

6. The liquid ejection head according to claim 5, wherein the first resin includes a thermosetting component, and the second resin includes a photo curable component.

7. The liquid ejection head according to claim 5, wherein, when viewed from a direction perpendicular to the support surface, the second resin has a portion that overlaps with the area and a portion that is exposed from the ejection unit on the support member.

8. The liquid ejection head according to claim 5, wherein the support member includes a concave portion, and the ejection unit is arranged in the concave portion.

9. The liquid ejection head according to claim 5, wherein the second resin is surrounded by the first resin.

10. The liquid ejection head according to claim 5, wherein the second resin is arranged in three of the four areas, and wherein the first resin is arranged in one of the four areas where the second resin is not arranged.

11. The liquid ejection head according to claim 5, wherein the support member is made of a resin.

12. The liquid ejection head according to claim 5, wherein the second resin is arranged outside the first resin that surrounds the supply path.

13. The liquid ejection head according to claim 5, wherein the support member includes a plurality of the ejection units, and wherein a distance between the second resins provided corresponding to each adjacent ejection unit of the plurality of the ejection units is 5 millimeter (mm) or more.

14. The liquid ejection head according to claim 5, wherein the element substrate is a parallelogram.

15. The liquid ejection head according to claim 5, wherein the support member includes a plurality of the ejection units, and wherein the second resins are arranged in a direction facing each other across the element substrate and in a direction intersecting a direction in which the plurality of the ejection units is aligned.

16. The liquid ejection head according to claim 5, wherein the ejection unit further includes an electric wiring board that is bonded to a side of the element substrate, and wherein a center of an electrical connection portion that connects the element substrate and the electric wiring board is shifted from a center of the side of the element substrate.

* * * * *